United States Patent [19]

McCalley et al.

[11] Patent Number: 4,792,849
[45] Date of Patent: Dec. 20, 1988

[54] DIGITAL INTERACTIVE COMMUNICATION SYSTEM

[75] Inventors: Karl W. McCalley, South Barrington; Steven D. Wilson, Chicago; James L. Fischer, Barrington, all of Ill.

[73] Assignee: Telaction Corporation, Schaumburg, Ill.

[21] Appl. No.: 81,189

[22] Filed: Aug. 4, 1987

[51] Int. Cl.⁴ .................. H04N 7/10; H04N 11/00
[52] U.S. Cl. ............................. 358/86; 379/105; 455/4
[58] Field of Search ............ 358/85, 86; 379/96, 379/102, 104, 105; 455/4; 370/85; 340/825.35

[56] References Cited

U.S. PATENT DOCUMENTS

| | | | |
|---|---|---|---|
| 4,028,733 | 6/1977 | Ulicki | 360/10 |
| 4,381,522 | 4/1983 | Lambert | 358/86 |
| 4,450,477 | 5/1984 | Lovett | 358/86 |
| 4,450,481 | 5/1984 | Dickinson | 358/86 |
| 4,734,764 | 3/1988 | Pocock et al. | 358/86 |

Primary Examiner—Jin F. Ng
Assistant Examiner—Wing F. Chan
Attorney, Agent, or Firm—Amster, Rothstein & Ebenstein

[57] ABSTRACT

The present invention relates to a digital interactive communication system accessible to a plurality of subscribers who can select by means of their touch-tone telephones any of a plurality of pre-recorded video presentations representative of products and services for sale. In this system, the subscriber requests are received by a voice network interface which is coupled to a local area network. A plurality of data processors, typically single-board computers, capable of various tasks are operatively connected to the local area network. A number of these data processors are each dedicated to serving one subscriber during a requesting session. Other data processors coupled to the local area network provide either navigational, subscriber, or purchase information during a subscriber session. Also coupled to the local area network is a large-scale data base which stores digital information representing the video presentations which are requested by subscribers for viewing on their televisions sets. Coupled to the large-scale data base is a second local area network, for transmitting the digital information representing the video presentations to a CATV network for distribution to the subscriber's television set.

17 Claims, 1 Drawing Sheet

DIGITAL INTERACTIVE COMMUNICATION SYSTEM

FIELD OF THE INVENTION

The present invention relates to an digital, interactive communication system capable of transmitting at a subscriber's request still television video frames, possibly with an accompanying audio message, and more particularly to such a system where video and audio information is encoded, processed and stored in a digital format.

BACKGROUND OF THE INVENTION

Conventionally, different kinds of communication systems are used to provide voice, data, and video communication services to subscribers. In particular, interactive cable television systems have been developed to distribute information to subscribers' televisions at their requests. One such system concerns a shopping service where subscribers shop at home from an "electronic catalog" or in an "electronic mall". This system is distinguished from home shopping channels since it allows subscribers to select which products or services they will view on their television screens by use of Touch-Tone telephones. Additionally, the subscriber selects the pacing of the product or service display. In operation, the subscriber will tune to a channel and dial a predetermined telephone number to access the system. As soon as the system identifies the subscriber, his television screen begins to display still frame video, and possibly accompanying audio, and directories of "electronic stores" comprising products or services that may be entered or passed, examined in further detail, saved for future consideration, or purchased just by touching keys on a Touch-Tone telephone in response to prompts on the television screen. A mainframe host computer controls the flow of information in the system.

This shopping service uses a CATV network to distribute the video presentations and accompanying audio messages requested by subscribers. At various locations in the CATV network, a device known as a frame store unit captures the video. Each of these locations serves a small group of subscribers. The function of each frame store unit is to capture the video frame destined for one of the subscribers associated with the frame store unit. The frame store unit captures a video frame bearing its address and converts the frame into a form it can store. Next, the frame store unit determines which audio message to associate with the video frame, bundles the audio and video together, and injects the result into the CATV feeder cable. The composite signal transmitted by the frame store unit appears as a standard television picture on the subscriber's television.

Other interactive cable television systems require that each subscriber have his own dedicated channel for viewing video and audio presentations. Still other such systems require the subscriber view such presentations on his own computer terminal.

Disadvantages of these earlier systems include the requirement of a large mainframe computer, and the processing of data in an analog format. The system of the present invention provides the same services as these earlier systems but uses a plurality of powerful, single board computers connected as a local area network ("LAN") in lieu of a centralized computer or mainframe computer.

In a computer network, a large number of separate but inter-connected computers do the work of a single centrally located computer. In any computer network, the inter-connected computers are each autonomous. Several distinct advantages are found in using a LAN over a centralized computer system.

One such advantage concerns the relative price of computing versus communication. Until 1970, computers were relatively expensive compared to communications facilities. The reverse is now true. With the cost of small computers being relatively negligible, it has become attractive to analyze the data at the location where it originates. Analyzing data at the place of origination reduces communication costs, which now represent a larger percentage of total cost than it did in the past.

Another advantage of computer networking is the superior price/performance ratio of small computers over large mainframe computers. Mainframe computers are approximately a factor of 10 times faster than the largest single-chip microprocessor, but they cost a thousand times more than the single chip microprocessor. This imbalance in the price/performance ratio makes it more attractive to use many microcomputers located close together (a LAN) to out-perform the large mainframe computer.

In addition to a favorable price/performance ratio, LANs have other advantages over a single centralized system. For one thing, they are more reliable than a centralized computer system since a single hardware or software failure in a LAN will only bring down one processor, and not affect the others.

Another major advantage of building large computer systems by coupling large numbers of small processors together is the expectation of a simpler software design. In a computer network, it is possible to dedicate some, or all, of the processors to specialized functions. That is, instead of having the processors multi programmed, each processor does only one function at any time. By eliminating the need for multi-programming, software complexities associated with the large mainframe computers are eliminated.

A further advantage of LANs is their ability to increase system performance gradually as the work load increases by merely adding more processors.

Accordingly, the major advantages of using a LAN in the system of the present invention are (1) a more favorable price/performance ratio, (2) acceptable degradation in performance upon failure of a processor, and (3) the practicality of incremental growth.

Also, the system of the present invention receives, processes and transmits data in a digital format as contrasted to the earlier systems which substantially processed data in an analog format. The advantages of a digitized system as compared to an analog system are numerous; for example, (1) equipment and circuits for digital systems have been declining in cost by a factor of two every three years for about the last twenty years, while the cost of analog circuits have not declined as fast, (2) digital signals are easier to multiplex than analog signals, and (3) digital signals, because they are represented by pulses of well defined and uniform shape, are easy to store and regenerate thereby permitting accurate reproduction of the original signals.

Thus, the use of digitally formatted signals and the incorporation of a LAN make the system of the present invention suprior and more cost efficient than the earlier systems.

SUMMARY OF THE INVENTION

An object of this invention is to overcome the deficiencies of the prior art noted above by providing a digitized, interactive communication system capable of transmitting to subscribers television quality, still video presentations with accompanying audio.

It is another object of this invention to provide an interactive communication system incorporating the cost and performance advantages of local area networks.

It is a further object of this invention to provide a new and improved interactive communication system for merchandising products and services to subscribers.

The present invention is directed to a digitized, interactive communication system capable of being accessed by a plurality of subscribers for generating digital information representative of selected images in response to a subscriber's request made during a requesting session. The system includes a local area network capable of transmitting digital information, and a voice network interface coupled to the local area network and selectively placed in communication with one or more of the subscribers during a requesting session for receiving the subscribers' requests and for generating digital information representative of the identity of each requesting subscriber and of the content of the request made by each subscriber. A data base coupled to the local area network stores in digital form the images which the subscribers can select for viewing.

A plurality of single board computers are each operatively connected to the local area network. A number of the single-board computers are designated the task of being session servers. As session servers they are each dedicated to serving one subscriber during a requesting session. The session servers translate the digital signals from the voice network interface to a command signal understood by the other single-board computers and transmits such command signal to the other single board computers through the local area network. At least another of the single-board computers is selectively dedicated during a requesting session to obtain biographical information relating to the requesting subscriber. Another of the single board computers is selectively dedicated during a requesting session to receive the command signal from the session server, determine which images the subscriber selected, and requests the data base to send such selected images to the subscriber. Means, such as a second local area network, are operatively coupled to the data base for transmitting the digital information representative of the selected image to the subscriber. In addition, at least one other of the single board computers is selectively dedicated during a requesting session for processing additional information with request to signals generated by such requesting subscriber.

BRIEF DESCRIPTION OF THE DRAWING

For a fuller understanding of the nature and objects of the invention, reference should be made to following detailed description, taken in connection with the accompanying drawing.

DETAILED DESCRIPTION OF THE INVENTION

Figure 1:
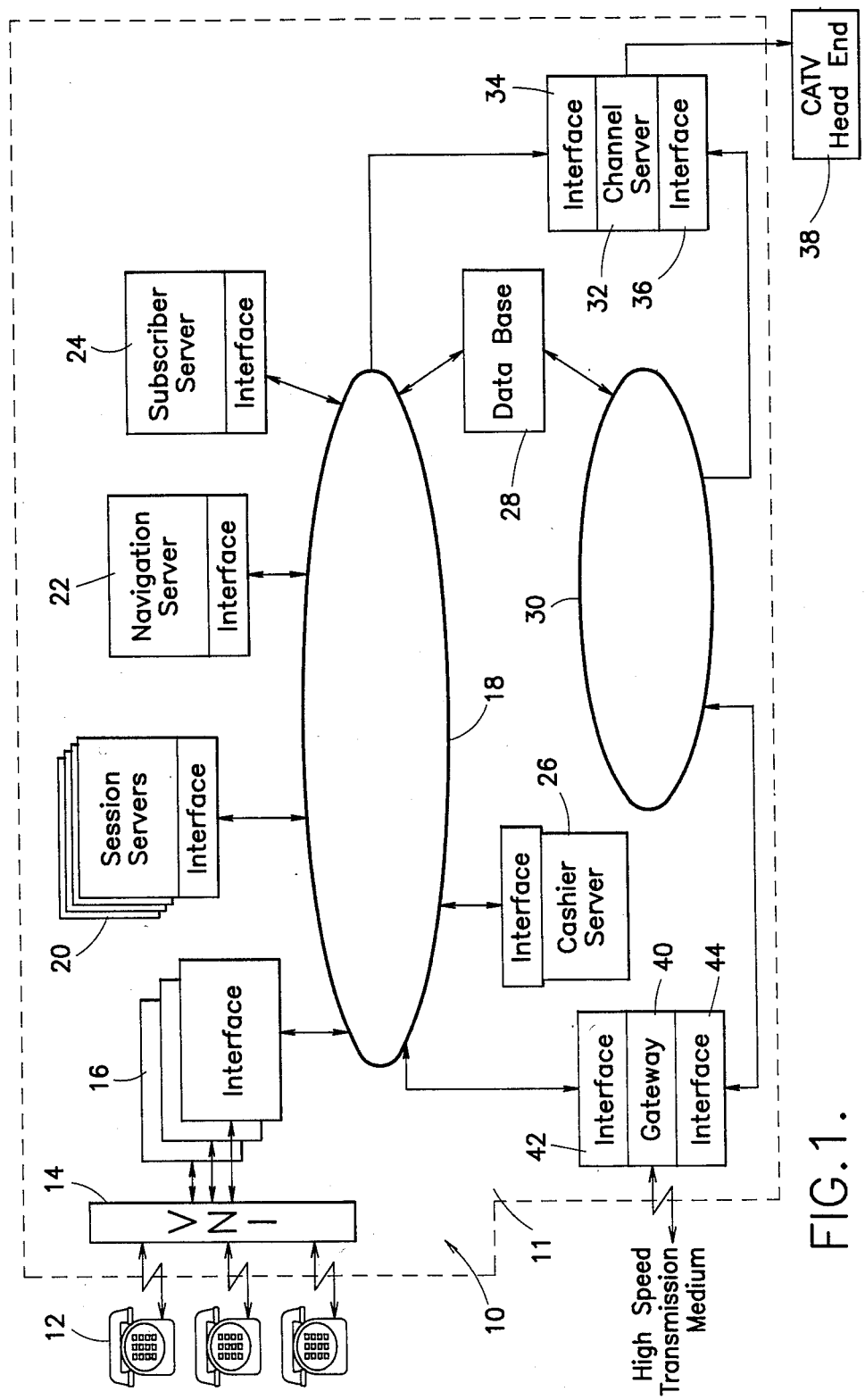
FIG. 1 is a block diagram of the digital, interactive communication system of the present invention for providing subscribers with television quality, still-video presentations and accompanying audio.

Referring to FIG. 1, the interactive cable television system of the present invention is generally designated as 10. In operation of system 10, a subscriber uses a Touch-Tone telephone 12 to communicate with the system 10. The transmission signals sent through telephone 12 are carried over convential telephone lines to a Local Operating Center ("LOC") 11 of the system 10, which makes use of local area network technology. At the LOC 11, the tone signals of telephone 12 are received by a voice network interface 14 ("VNI"). If the tone-signals are conventional voice grade transmissions, they are transmitted to VNI 14 in analog format and are recognized and decoded by VNI 14 to ASCII characters recognized by an interface 16. In the instance where the tone-signals are received by VNI 14 as digital signals, VNI 14 likewise transforms the digitized touchtone signals into a protocol recognized by interface 16. VNI 14 is preferably a Summa Four, Inc., Specialty Digital Switch Model No. SDS-1000 having a predetermined number of outgoing telephone lines for bridging incoming subscriber calls to service representatives when required. Notwithstanding whether the tone signals are in digital or analog form, the output signal of VNI 14 is transmitted to a first local area network 18 ("LAN") via the interface 16. While VNI 14 is shown in FIG. 1 as being located at the LOC 11, it is anticipated by the present invention that VNI 14 need not be co-located at the same location as LOC 11.

The network topology of first LAN 18, that is the physical organization of the network, is known as a ring topology. A ring topology has all devices in the network connected by a single communications cable that forms a circle or ring. Signals are sent from one device to another around the ring. As a signal moves around the ring, each device in the LAN electronically detects whether the message is for it. If it is, the device processes the signal. If not, the device will normally regenerate the signal and transmit it to the next device in the ring.

Network access identifies the procedures that allow each device in the network to communicate and receive data. The network access method used in LAN 18 is conventionally known as token passing. A token is a special bit pattern that constantly travels around the network. Every device in the network must wait until it receives the token, before it can transmit a message. When the device receives the token, it transmits its message, reinserts the token in the network, which is then passed to the next device in the network. If a device has no message to send, it allows the token to pass to the next device in the network. In effect, possession of the token is permission to transmit a message.

The transmission medium connecting devices in LAN 18 is preferably a baseband coaxial cable. Baseband coaxial cable carries one signal at a time, but the signal travels at a rapid speed—in the range of ten million bits per second. Any of a number of convential methods are used to allow many devices to access LAN 18 concurrently.

The devices comprising LAN 18 include a plurality of single board computers each having a special function in serving the subscribers, as well as a random access memory, a clock, and input/output facilities. The single-board computers each include specialized application software and are associated with an interface which connects it to LAN 18. In addition to the single board computers, LAN 18 further comprises a large-scale data base 28 conventionally referred to as a "disc farm". Stored in the data base's hard disk memory units is digitized information representing video presentations of goods or services. Generally, these video presentations comprise television quality, still frame images, or textual information, or textual information overlayed on a still-frame image, or any combination of the foregoing. These video presentations may be accompanied by an audio message. Any of these stored video presentations and accompanying audio can be viewed by a subscriber upon request during any session on the system 10. Also stored in data base 28 is navigational information describing the pathways between presentations, as well as information about sbscribers. Typically, the companies offering goods or services to subscribers develop a structure of video presentations representing an electronic store.

The single board computers coupled to LAN 18 are manufactured by Intel Corporation of Santa Clara, Calif. and are designated as Model No. iSBC 36/100 or Model No. iSBC 186/100. The computers are denoted according to their functional application in the LAN 18, and are identified in FIG. 1 as the session server 20, navigation server 22, subscriber server 24, and cashier server 26. While the servers 20, 22, 24, and 26 are each identified by a single functional task, the present invention anticipated that each server will have appropriate software so that the server can switch functions depending on the demands on system 10. During any subscriber session on system 10, one session server 20 will be dedicated to serving a particular subscriber. The number of session servers 20 at any LOC 11 will depend on the number of subscribers serviced by the LOC 11. Accordingly, the number of session servers 20 at a LOC 11 could be anywhere in the range of 100 to 2,000 units.

The output message from VNI 14 is transmitted through interface 16 to one of the plurality of session servers 20. Interface 16 associates an incomming subscriber call to an available session server 20. The session server 20, like all the servers comprising the LAN 18 is itself connected to LAN 18 by means of an interface. Though each server is shown in FIG. 1 as connected to an interface, in the physical construction of LAN 18 an interface may be shared by a plurality of servers.

Session server 20 processes the message by translating or converting it into some logical signal that the other servers understand, and then passes the signal on to LAN 18 for further processing by the other servers. In essence, the session server 20 interprets the digital signal representing a key on the Touch-Tone telephone 12 and sends out a command or commands to other servers on LAN 18. Included in these commands are the subscriber's requests for selected presentations.

Navigation sever 22 includes a dynamic RAM memory which can store at any instance sufficient information to enable the subscriber to move about any of the clients' presentation structures. The information stored in naviagtion server 22 defines the pathways between the presentations in any presentation structure. Since navigation server 22 incorporates a dynamic RAM memory, it will only store navigation information that is useful at any particular time in a subscriber session. Typically, the dynamic RAM memory of naivgation server 22 has approximately 10 megabytes of RAM memory. Thus navigation server 22 is not capable of storing all of the clients' presentation networks within its memory. This information is stored in the hard disk memories of data base 28.

In operation of system 10, the subscriber designates the presentation or presentations he desires to view by depressing keys on Touch-Tone telephone 12. The digitized signals which represent the depressed telephone keys are processed by session server 20 and are addressed to navigation server 22. Navigation server 22 fetches from data base 28 the navigational data needed at that time to move about a presentation network in accordance with the subscriber's requests. Thus, for example, as the subscriber requests information within a specific presentation structure, the dynamic memory will only store navigational information about that portion of the presentation network that could be requested by the subscriber at that particular time in the subscriber session. As the session proceeds and the subscriber moves about the presentation structure, the navigation information within the dynamic memory will change with the subscriber's movement in the structure. According to this navigational data stored within its dynamic memory, and from its interpretation of the digitized signals of session server 20, the navigation server 22 determines which of the presentations stored in data base 28 hve been selected by the subscriber and transmits a signal through LAN 18 for data base 28 to transmit the requested presentations to the subscriber.

Subscriber server 24 stores information about system 10 subscribers. The information stored about each subscriber includes the subscriber's telephone number, the subscriber's personal identification number, and it identifies a presentation player designated to receive the subscriber's requested presentations. As will be explained in more detail below, the presentation player receives, stores, and re-transmits to the subscriber those presentations requested by the subscriber.

Typically server 24 is active for only a portion of any subscriber session. In the operation of system 10, session server 20 queries subscriber server 24 for information concerning a subscriber. Subscriber server 24 then fetches the requested information and sends it to session sever 20 which stores the information in its memory. Since session server 20 is active during the entire subscriber session there is no further need to query subscriber server 24 for information during the remainder of the subscriber's session.

Cashier server 26 processes all information concerning the subscriber's purchase of merchandise or services. For example, cashier server 26 queries the subscriber as to the means by which he intends to pay for purchases. If the subscriber selects a credit card as means for payment, cashier server 26 accesses the subscriber's credit card identification number from data base 28 and transmits an appropriate message to an authorization service so that the pruchase is charged to the subscriber's credit card. Another function of cashier server 26 is to advise the clients of purchases so that the goods are sent expeditiously to the subscriber.

Purchase information can be transmitted on-line to the client or it can be stored in cashier server 26 and "batched" to a client at a later time. For example, all purchases made during the given period are stored by cashier server 26 in a storage data file, but at the end of the period they are sent in batches to the various clients for further processing. Cashier server 26 can also describe the means by which the purchased goods will be delivered to the subscriber. That is, it will advise the client whether the goods are to be shipped and by which means, or whether the subscriber will pick-up the goods at the client's store.

A second LAN 30, also a ring topology, is connected to data base 28 for sending the digital signals representing the video presentations to a CATV system 32. Transmission of a single video frame requires approximately 30 kilo bytes to 50 kilo-bytes of information. Since a large number of bytes of digital information is required to represent the video or image portion of a presentation, second LAN 30 is needed since it accomodates a larger quantity of digital information at a higher rate of speed than first LAN 18. To meet this requirement, the transmission medium of second LAN 30 is a broadband medium and preferably a fiber optic cable comprising several optical fibers having a broader bandwidth than first LAN 18. Preferably, second LAN 30 is capable of transmitting an aggregate of 40 million bytes of information per second as compared to first LAN 18 which transmits several hundred thousand bits of information per second.

A channel server 32 receives subscriber control information from first LAN 18 and information representative of selected video presentations from second LAN 32 for transmission to a CATV head end 38. Interface 34 and interface 36 repsectively couple channel server 32 to first LAN 18 and second LAN 30.

Channel server 32 comprises a microprocessor, a RAM memory of several megabytes, a forward error correction encoder, and a modulator. The video, audio and control information received by channel server 32 is converted into a high-speed digital stream and modulated so that is is suitable for transmission by a cable television network. Channel server 32 is also schedules the order in which the information is sent to the cable television network, and performs forward-error correction coding to assume reliability in transmission by the cable television network.

The present invention anticipates that a LOC 11 will service approximately 5,000 to 10,000 subscribers depending on its location. Each LOC 11 is capable of communicating with other LOCs by means of a gateway 40 which in turn communicates with a high speed transmission medium, such as a broadband terristal or a communication satellite. Gateway 40 comprises a microcomputer having a memory of at least several megabytes, and is coupled to first LAN 18 and second LAN 30 by interface 42 and interface 44, respectively. In communicating with other LOCs, LOC 11 can request information, such as a video presentation not found in its data base 28, and can in turn respond to the requests of other LOCs.

Although the illustrative embodiment of the present invention has been described in detail with reference to the accompanying drawing, it is to be understood that the invention is not limited to this precise embodiment and that various changes or modifications may be effected therein by one skilled in the art without departing from the scope or spirit of the invention. For example, while the system 10 of the present invention has been described as including a plurality of single board computers, those skilled in the art recognize that system 10 could instead comprise a plurality of multiple-board computers. Moreover, a commercial embodiment of system 10 would include a plurality of navigation servers 22, subscriber servers 24, and cashier servers 26 mounted in a housing. The exact number of these servers would be dependent on the load requirements of system 10.

What is claimed is:

1. A system accessible to a plurality of subscribers for generating digital information representative of selected images in response to requests made by at least one of said subscribers during a requesting session, said system comprising:
   a local area network capable of transmitting digital information;
   a voice network interface coupled to said local area network by means of an interface and selectively placed in communication with one or more of said subscribers during a requesting session, for receiving subscriber requests and for generating digital information representative of the identity of each requesting subscriber and of the content of the requests made by each such subscriber;
   a plurality of data processors, each operatively coupled to said local area network;
   a data base coupled to said local area network and having stored therein digital information representative of selected images:
   a number of said data processors each being dedicated to serving one requesting subscriber during a requesting session, such server data processors translate the digital signals from the voice network interface to command signals understood by said other data processors and transmits such command signals to said other data processors through said local area network;
   at least another of said data processors being selectively dedicated during a requesting session to obtaining biographical information relating to said requesting subscribers;
   at least another of said data processors being selectively dedicated during a requesting session to receive said command signals from said server data processor, and determine which images the subscriber selected, and request said data base send said selected images to the subscriber;
   means operatively coupled to said data base for the high-speed transmission of digital information representative of said selected images; and
   at least another of said data processors being selectively dedicated during a requesting session for processing additional information with respect to signals generated by each requesting subscriber.

2. A system in accordance with claim 1 in which said data processors are single-board computers having random access memory, clock and input/output facilities.

3. A system in accordance with claim 1 in which said data processors are multiple-board computers having random access memory, clock and input/output facilities.

4. A system in accordance with claim 1 in which said images comprise still-frame video, textual information, or textual information overlayed on a still-frame video.

5. A system in accordance with claim 1 in which said digital information representative of selected images including audio, video and textual material.

6. A system in accordance with claim 1 in which transmission medium of said local area network is a baseband coaxial cable.

7. A system in accordance with claim 1 in which said local area network is a ring topology.

8. A system in accordance with claim 1 in which said means coupled to said data base is a second local area network used for transmitting said selected images to the requesting subscriber.

9. A system in accordance with claim 8 further comprising a channel server coupled by interfaces to said first and second local area networks for transmission of control information, image information, and associated information to the subscriber by means of a cable television network.

10. A system in accordance with claim 9 in which said channel server comprises a microprocessor, a memory, a forward-error correction encoder, and a modulator.

11. A system is accordance with claim 8 in which said second local area network is a ring topology.

12. A system in accordance with claim 8 in which the transmission medium of said second local area network is a fiber optic cable.

13. A system in accordance with claim 8 in which the transmission medium of said second local area network is a broadband coaxial cable.

14. A system in accordance with claim 1 further comprising means for communicating with other like systems.

15. A system in accordance with claim 14 in which said means for communicating with other like systems is a gateway coupled to said system and capable of communication with a common-link, high speed transmission medium.

16. A system in accordance with claim 1 in which said digital information representative of selected images include accompanying audio messages.

17. A system accessible to a plurality of subscribers for generating digital information representative of selected images in response to requests made by at least one of said subscribers during a requesting session, and system comprising:
   a first local operating center serving a first group of said subscribers comprising;
   a first local area network capable of transmitting digital information;
   a voice network interface coupled to said first local area network by means of an interface and selectively placed in communication with one or more of said subscribers during a requesting session, for receiving subscriber requests and for generating digital information representative of the identity of each requesting subscriber and of the contents of the requests made by each such subscriber;
   a first group of data processors each operatively coupled to said first local area network;
   a first data base coupled to said first local area network and having stored therein digital information representative of selected images:
   a number of said first group of data processors each being dedicated to serving one requesting subscriber during a requesting session, such server data processors translate the digital signals from the voice network interface to command signals understood by said other data processors and transmits such command signals to said other data processors through said first local area network;
   at least another of said first group of data processors being selectively dedicated during a requesting session to obtaining biographical information relating to said requesting subscribers;
   at least another of said first group of data processors being selectively dedicated during a requesting session to receive said command signals from said server data processor, and determine which images the subscriber selected, and request said first data base send said selected images to the subscriber:
   means operatively coupled to said first data base for the high speed transmission of digital information representative of said selected images; and
   a first gateway coupled to said first local operating center and capable of communication with a common-link, high-speed transmission medium,
   a second local operating center for serving a second group of said subscribers comprising;
   a second local area network capable of transmitting digital information;
   a second voice network interface coupled to said local area network by means of an interface and selectively placed in communication with one or more of said second group of subscribers during a requesting session, for receiving subscriber requests and for generating digital information representative of the identity of each requesting subscriber and of the contents of the requests made by each such subscriber;
   a second group of data processors each operatively coupled to said second local area network;
   a second data base coupled to said second local area network and having stored therein digital information representative of selected images;
   a number of said second group of data processors each being dedicated to serving one requesting subscriber during a requesting session, such server data processors translate the digital signals from the voice network interface to command signals understood by the other of said second group of data processors and transmits such command signals to said other data processors through said second local area network;
   at least another of said second group of data processors being selectively dedicated during a requesting session to obtaining biographical information relating to said requesting subscribers;
   at least another of said second group of data processors being selectively dedicated during a requesting session to receive said command signals from said server data processor, and determine which images the subscriber selected, and request said second data base send said selected images to the subscriber;
   means operatively coupled to said second data base for the high speed transmission of digital information representative of said selected images; and
   a second gateway coupled to said second local operating center and capable of communication with a common-link, high speed transmission medium for interactive communication with said first local operating center.

* * * * *

UNITED STATES PATENT AND TRADEMARK OFFICE
CERTIFICATE OF CORRECTION

PATENT NO. : 4,792,849

DATED : December 20, 1988

INVENTOR(S) : McCalley et al.

It is certified that error appears in the above-identified patent and that said Letters Patent is hereby corrected as shown below:

On the title page add

--FOREIGN PATENT DOCUMENTS

GB 2062419A          5/1981          United Kingdom--

Signed and Sealed this

Fourth Day of July, 1989

Attest:

DONALD J. QUIGG

Attesting Officer

Commissioner of Patents and Trademarks